(12) United States Patent
Cheng

(10) Patent No.: US 6,763,230 B2
(45) Date of Patent: Jul. 13, 2004

(54) FREQUENCY-LOCK FILTERING RECEIVER

(75) Inventor: Ting-Yuan Cheng, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 579 days.

(21) Appl. No.: 09/785,311

(22) Filed: Feb. 20, 2001

(65) Prior Publication Data

US 2002/0115420 A1 Aug. 22, 2002

(51) Int. Cl.[7] .............................................. H03B 1/10
(52) U.S. Cl. ........................ 455/323; 455/307; 455/339
(58) Field of Search ................................. 455/333, 323, 455/339, 340, 317, 373, 318, 307, 334

(56) References Cited

U.S. PATENT DOCUMENTS

| | | | | |
|---|---|---|---|---|
| 4,792,993 A | * | 12/1988 | Ma | 455/266 |
| 4,843,637 A | * | 6/1989 | Shimura et al. | 455/200.1 |
| 5,781,851 A | * | 7/1998 | Saito | 455/182.1 |
| 5,926,752 A | * | 7/1999 | Lin | 455/323 |
| 6,208,850 B1 | * | 3/2001 | Tolson | 455/317 |
| 6,266,522 B1 | * | 7/2001 | Holden et al. | 455/339 |
| 6,334,060 B1 | * | 12/2001 | Sham et al. | 455/500 |
| 6,377,788 B1 | * | 4/2002 | Elder et al. | 455/266 |

* cited by examiner

*Primary Examiner*—Edward F. Urban
*Assistant Examiner*—Blane J. Jackson
(74) *Attorney, Agent, or Firm*—Birch, Stewart, Kolasch & Birch, LLP

(57) ABSTRACT

The present invention pertains to a frequency-lock filtering receiver and the method for the same. The receiver enters a tuning mode before receiving signals. A frequency synthesizer then generates the radio frequency (RF) to be received and adjusts the central frequency of a tunable filter through feedback control so as to lock in the RF to be received. Afterwards, the receiver enters a receiving mode to receive RF signals using an antenna and uses the central frequency of the tunable filter locked in the tuning mode to filter the RF signals and to receive signals.

14 Claims, 11 Drawing Sheets

FREQUENCY-LOCK FILTERING RECEIVER

BACKGROUND OF THE INVENTION

1. Field of Invention

The present invention relates to a frequency lock filtering receiver and the corresponding method that can be applied to receiving radio frequency signals.

2. Related Art

Superheterodyne is a method that uses local oscillation signals to mix with input signals and converts the frequency of input signals into a specific frequency. Superheterodyne receivers have the advantages of sufficient and stable amplification, high selectivity and ease in adjustment. However, they have some special problems such as images and nearby channel interferences.

With reference to FIG. 1, in a conventional superheterodyne receiver, an antenna 11 receives a radio frequency (RF) signal. A band select filter 12 performs band filtering. A low noise amplifier (LNA) 13 amplifies the RF signal. An image rejection filter 14 rejects images of the RF signal. A frequency synthesizer 17 generates a local oscillation signal needed when a mixer 15 lowers the frequency. The mixer 15 mixes the RF signal and the local oscillation signal to obtain an intermediate frequency signal. The intermediate frequency signal is filtered by a channel select filter 16 to obtain an intermediate frequency signal with nearby channel interference removed. The modulated signal is then amplified by a power amplifier 18, filtered by an emission band select filter 19 and transmitted to the antenna 111 for emission.

In particular, the image rejection filter 14 and the band select filter 12 are discrete components and cost higher. Furthermore, the frequency bandwidth is fixed, therefore it has to include all RF signals to be received. Its abilities to reject images and nearby channel interference should be improved.

SUMMARY OF THE INVENTION

In view of the foregoing, the present invention provides a frequency lock filtering method and device for receivers that can accurately filter signals and has strong abilities in rejecting images and nearby channel interferences.

The present specification discloses a frequency lock filtering receiver and the method for the same. The receiver uses a frequency synthesizer to generate the frequency of radio frequency (RF) signals to be received in a tuning mode. The central frequency of a tunable image rejection filter is adjusted through feedback control so that the central frequency locks in the RF to be received. Afterwards, the receiver enters a receiving mode to receive RF signals using an antenna and uses the central frequency of the tunable image rejection filter locked in the tuning mode to filter the RF signals and to receive signals.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
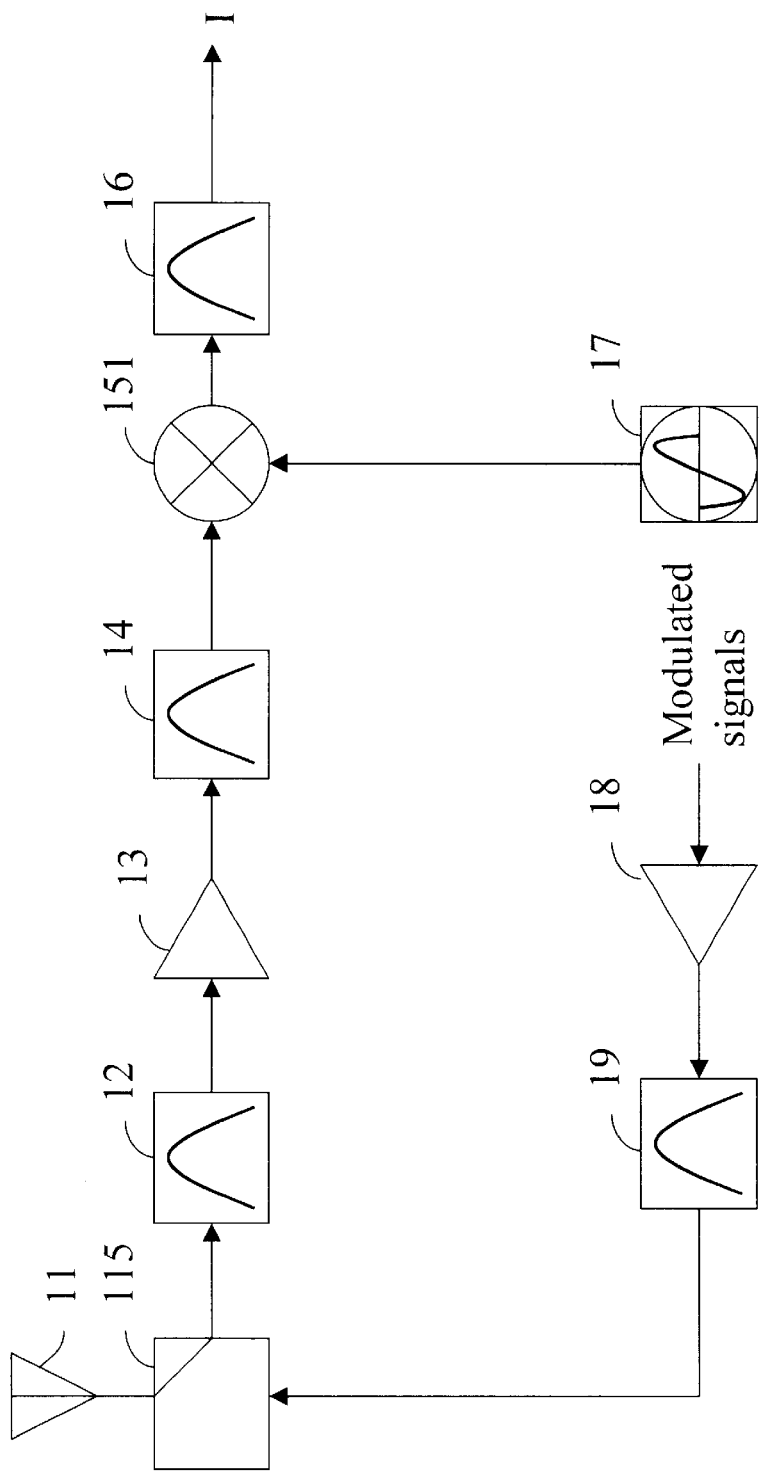
FIG. 1 is a system block diagram of a superheterodyne transceiver in the prior art.
Figure 2:
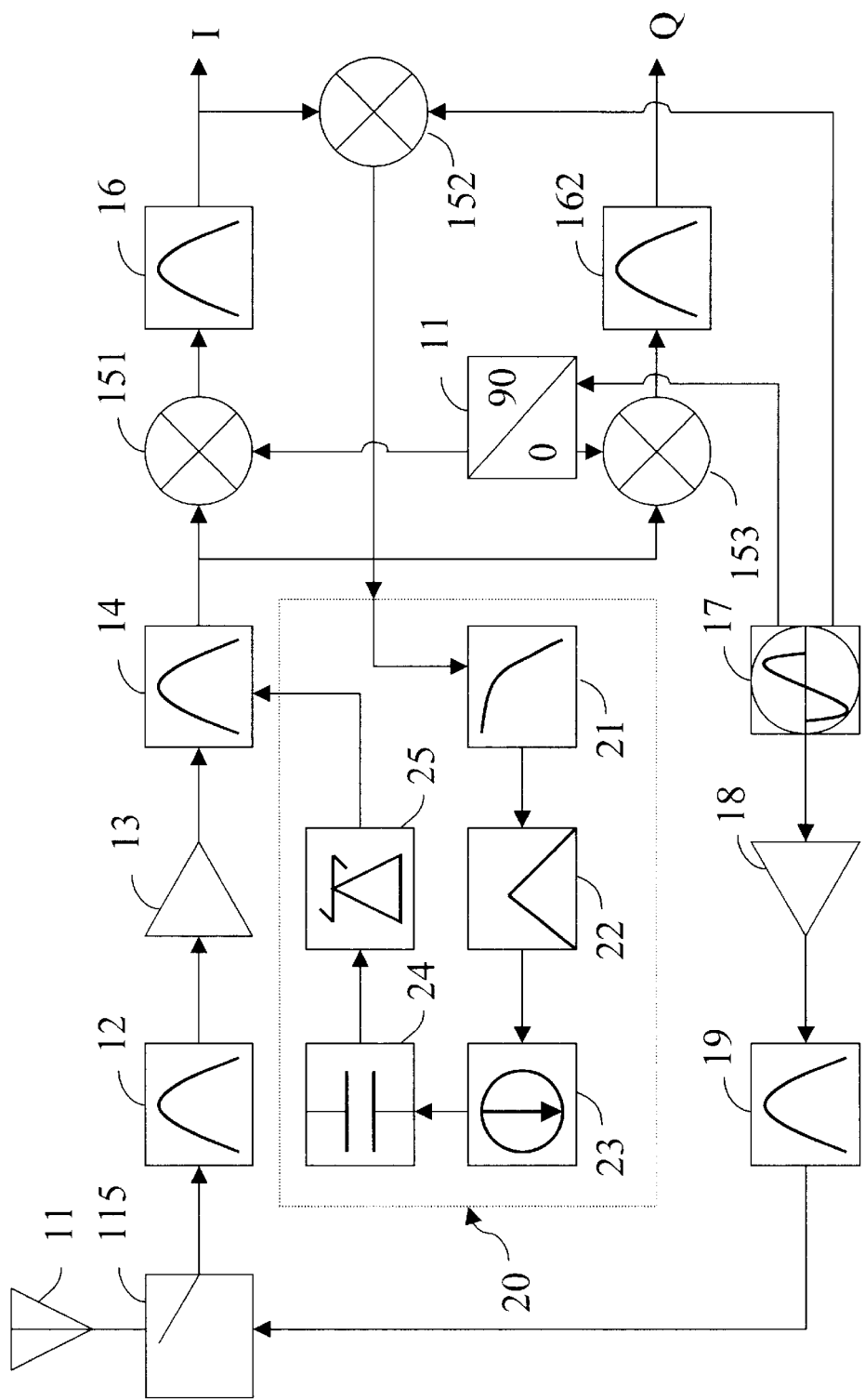
FIG. 2 is a block diagram of a frequency lock filtering receiver of the invention.

With reference to FIG. 2, the present invention discloses a frequency lock receiver. It obtains a central frequency of a tunable image rejection filter by feedback control in a tuning mode so that the central frequency locks in the frequency of the radio frequency (RF) signal to be received. It further filters the RF signal according to the lock-in frequency in a receiving mode. The receiver includes an antenna 11, a frequency synthesizer 17, a band select filter 12, a low noise amplifier (LNA) 13, a tunable image rejection filter 14, a first mixer 151, a second mixer 152, and a feedback control circuit 20.

Figure 3:
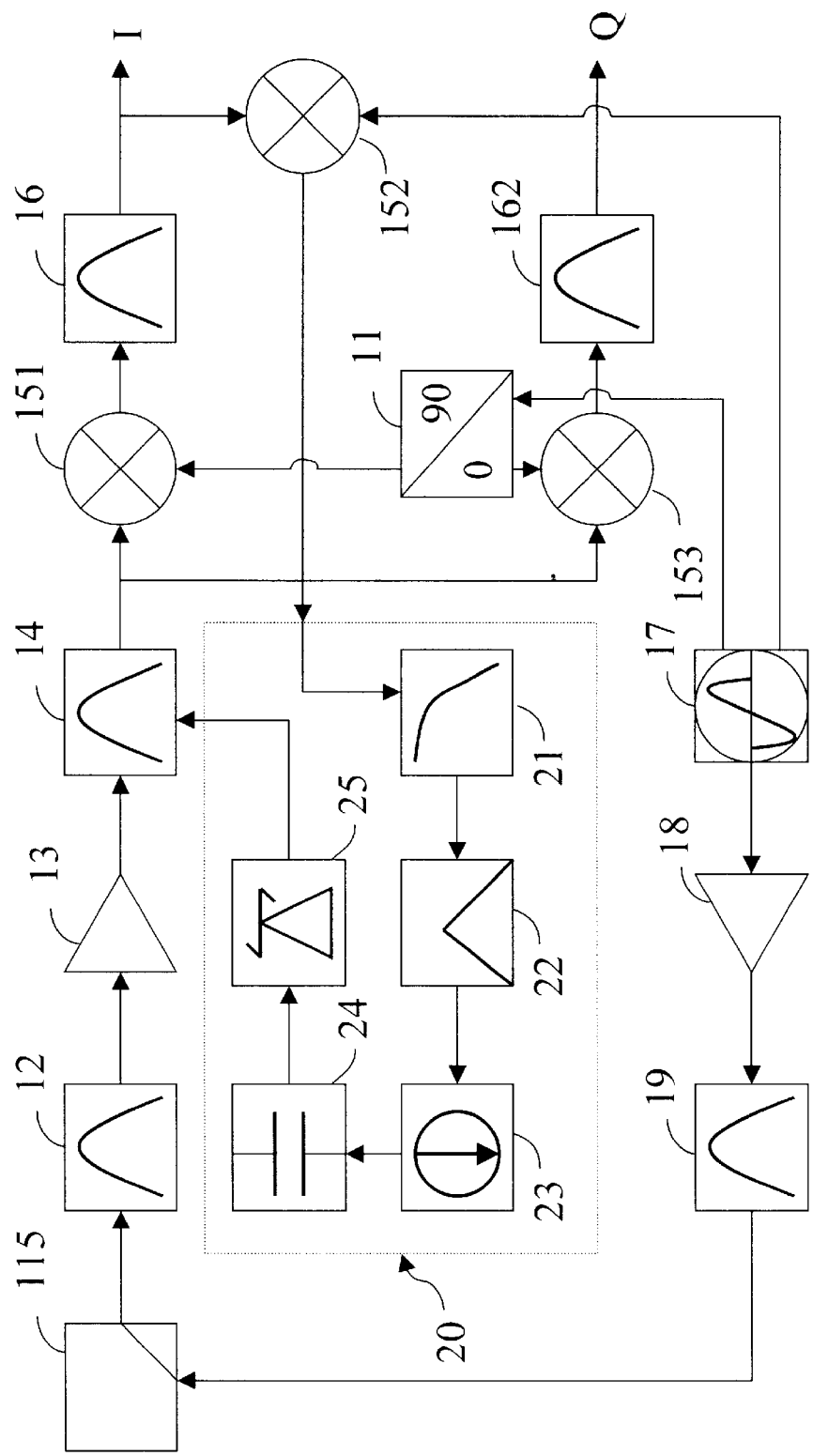
FIG. 3 is a block diagram of a frequency lock filtering receiver of the invention in the tuning mode.

With reference to FIG. 3, the RF signal is generated by the frequency synthesizer 17 in the tuning mode. The frequency synthesizer 17 generates a local oscillation signal, an RF signal and an intermediate frequency reference signal. The band select filter 12 connects to the frequency synthesizer 17 to receive the RF signal and perform band filtering. The LNA 13 connects to the band select filter 12 to amplify the RF signals. The tunable image rejection filter 14 connects to the LNA 3 to perform band filtering on the RF signal using a tunable central frequency.

The first mixer 151 connects to the tunable image rejection filter 14 to receive the RF signal and to receive the local oscillation signal transmitted from the frequency synthesizer 17. The received RF signal and local oscillation signal are then mixed to produce an intermediate frequency signal. The second mixer 152 mixes the intermediate frequency reference signal generated by the frequency synthesizer and the intermediate frequency signal generated by the first mixer 151 to produce a DC frequency difference signal.

The feedback control circuit 20 connects to the second mixer 152 and the tunable image rejection filter 14. The central frequency of the tunable image rejection filter 14 is adjusted by a DC frequency difference signal until it is stable. The central frequency of the tunable image rejection filter 14 thus locks in the frequency of the RF signals to be received. The feedback control circuit 20 includes a feedback filter 21, a slope sensor 22, a constant current source 23, a control capacitor 24, and a variable capacitor 25.

The feedback filter 21 performs low pass filtering on the frequency difference signal so as to extract the DC frequency difference signal. The slope sensor 22 connects to the feedback filter 21 to detect the time-dependent slope of the DC frequency difference signal. The constant current source 23 provides a constant current. The duration that the constant current source 23 is on is controlled by the signal generated by the slope sensor 22 and controlled by the slope of the DC frequency difference signal. The control capacitor 24 is charged by the constant current source 23 and obtains a control voltage. The variable capacitor 25 connects between the control capacitor 24 and the tunable image rejection filter 14. It changes the capacitance according to the control voltage obtained from the control capacitor 24, thereby changing the central frequency of the tunable image rejection filter 14.

Figure 4:
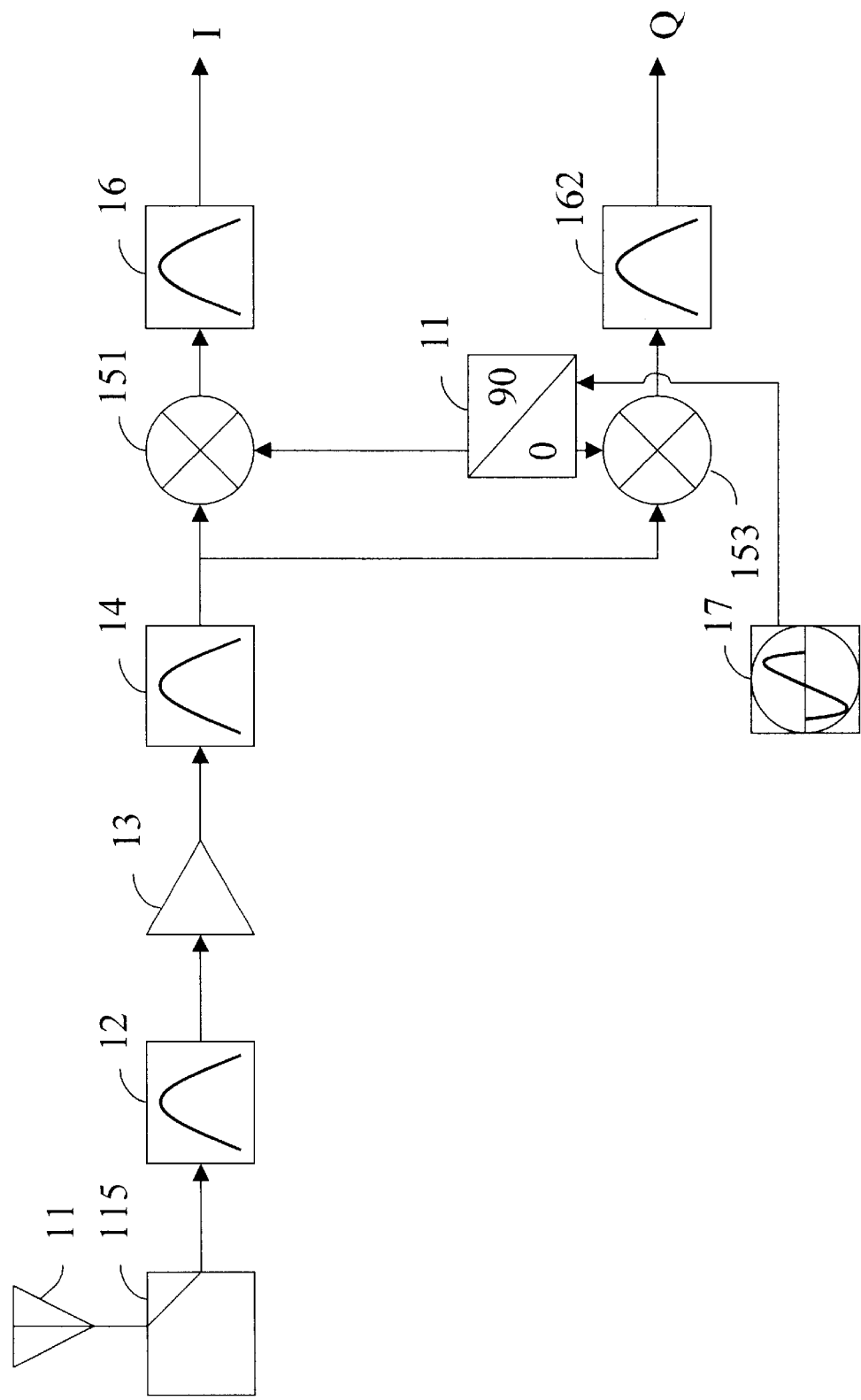
FIG. 4 is a block diagram of a frequency lock filtering receiver of the invention in the receiving mode.

With reference to FIG. 4, the RF signal is received by the antenna 11 in the receiving mode. The band select filter connects to the antenna 11 to receive the RF signal and to perform band filtering. The LNA 13 connects to the band select filter 12 to amplify the RF signal. The tunable image rejection filter 14 connects to the amplifier 13 and performs filtering on the RF signal using the lock-in central frequency obtained in the tuning mode. The frequency synthesizer generates a local oscillation signal to mix with the RF signal and generate an intermediate frequency signal.

Figure 5:
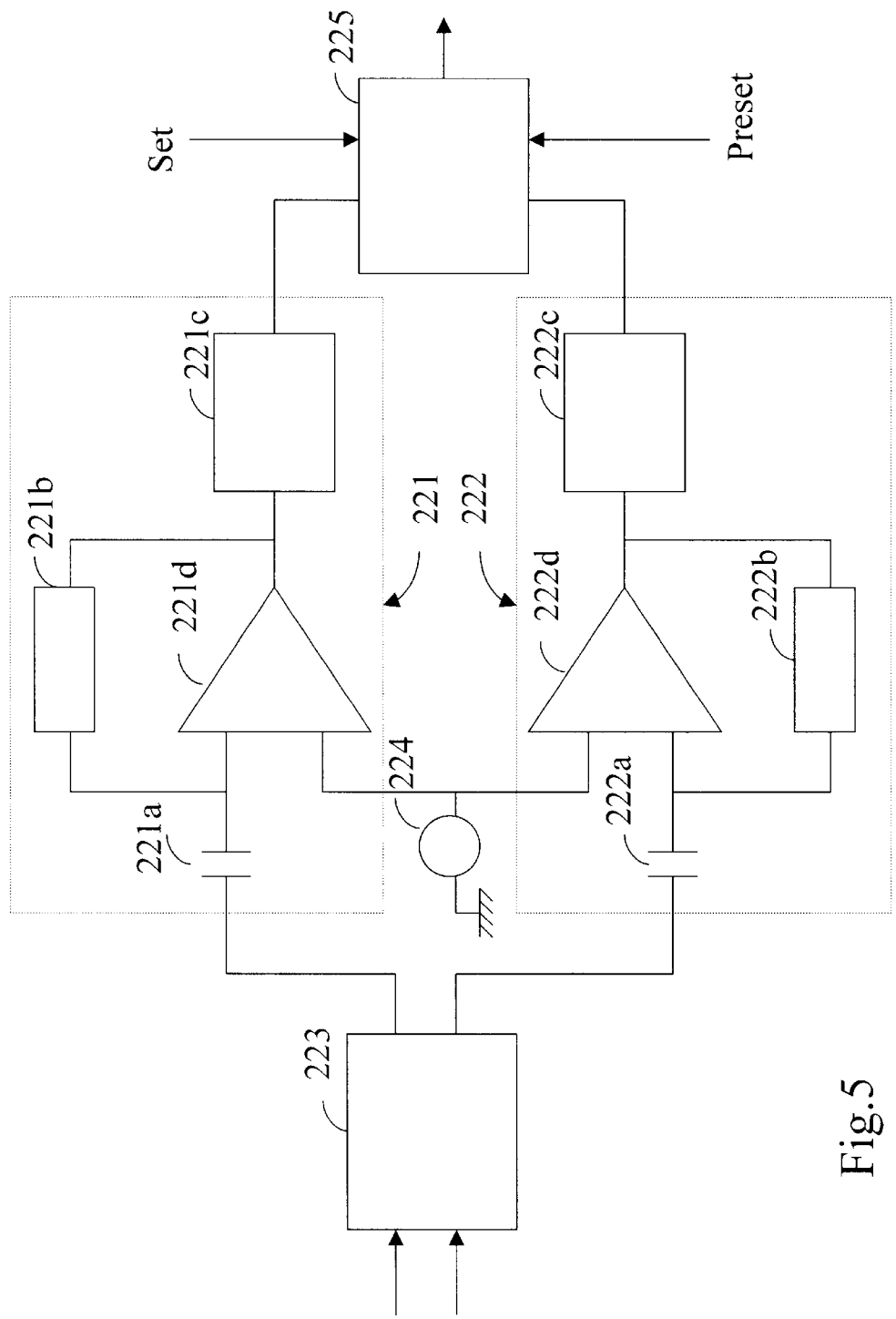
FIG. 5 is a composition diagram of a slope sensor of the invention.

With reference to FIG. 5, the slope sensor 22 is composed of a first differential circuit 221, a second differential circuit 222, a differential pair 223, a reference voltage source 224, and a logic controller 225.

The reference voltage source 224 provides a fixed voltage. The differential pair 223 connects to the feedback filter 21. The first differential circuit 221 connects to the differential pair 223 to perform differentiation. The second differential circuit 222 also connects to the differential pair 223 to perform differentiation. The logic controller 225 connects to both the first differential circuit 221 and the second differential circuit 222 to control the on and off of the constant current source.

The first differential circuit 221 consists of a first capacitor 221a, a first resistor 221b, a first hysteresis comparator 221c, and a first amplifier 221d. The positive input terminal of the first amplifier 221d connects to the reference voltage source 224. Its negative terminal connects to the first capacitor 221a and the first resistor 221b. Its output terminal connects to the first hysteresis comparator 221c and the first resistor 221b.

The second differential circuit 222 consists of a second capacitor 222a, a second resistor 222b, a second hysteresis comparator 222c, and a second amplifier 222d. The positive input terminal of the first amplifier 222d connects to the reference voltage source 224. Its negative terminal connects to the second capacitor 222a and the second resistor 222b. Its output terminal connects to the second hysteresis comparator 222c and the second resistor 222b.

Figure 6:
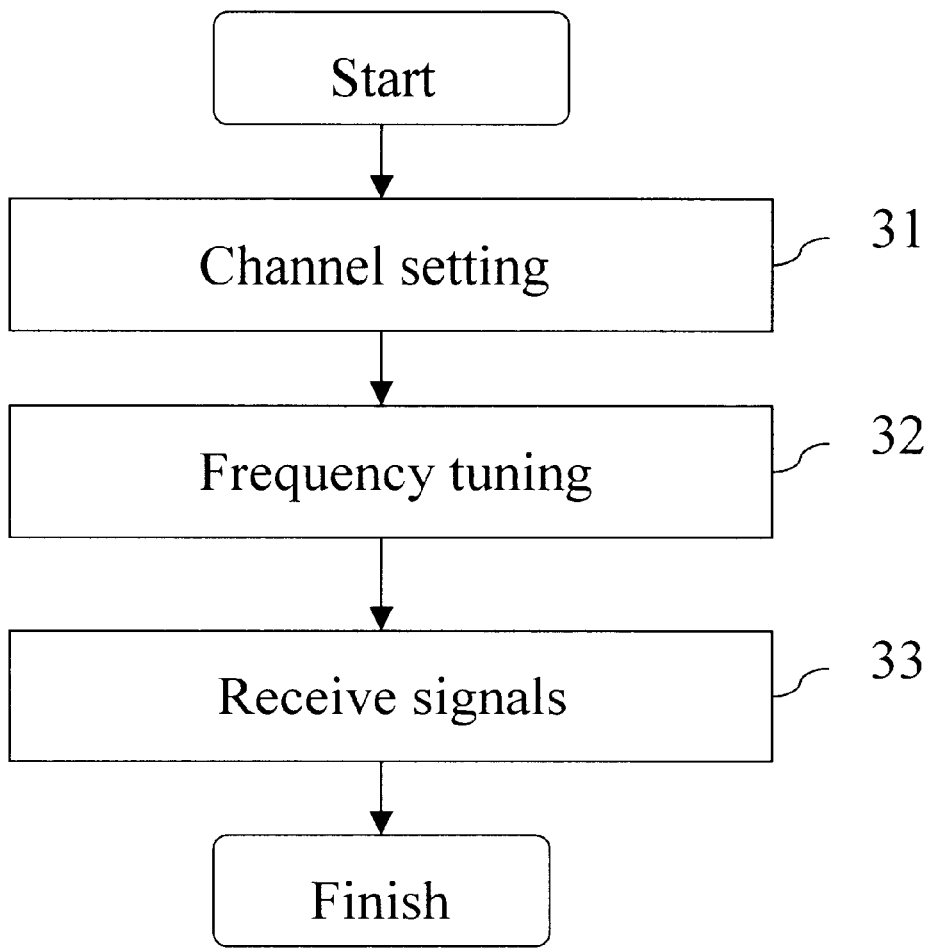
FIG. 6 is a flowchart of the disclosed receiving method using frequency lock filtering.

Referring to FIG. 6, the invention provides a receiving method using frequency lock filtering. The method includes such steps as channel setting 31, frequency tuning 32, and signal receiving 33.

The step of channel setting 31 sets the receiving frequency of RF signals. The step of frequency tuning 32 uses a frequency synthesizer to generate an RF signal and adjusts the central frequency of a tunable image rejection filter in a feedback control method so as to obtain the central frequency of the filter. The step of signal receiving 33 uses an antenna to receive the RF signal and uses a lock-in frequency as the central frequency of the tunable image rejection filter, thereby filtering the RF signal and receiving the signal.

Figure 7:
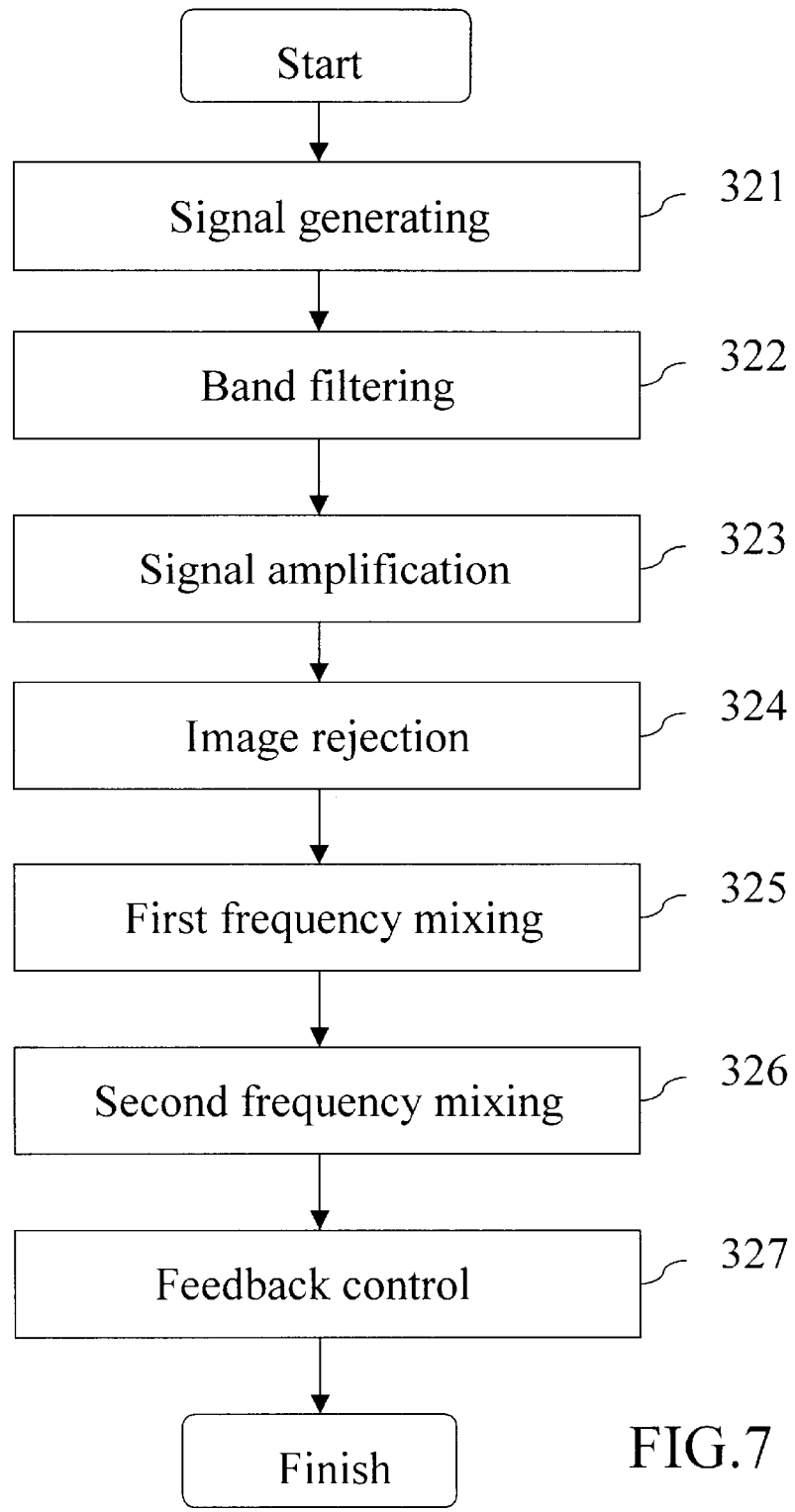
FIG. 7 is a flowchart showing the steps of tuning the frequency.

With reference to FIG. 7, the step of frequency tuning 32 includes such actions as signal generating 321, band filtering 322, signal amplification 323, image rejection 324, first frequency mixing 325, second frequency mixing 326, and feedback control 327.

The step of signal generating 321 uses a frequency synthesizer to generate an RF signal for setting the frequency, a local oscillation signal, and an intermediate frequency reference signal. The band filtering 322 uses a band select filter to filter the RF signal. The step of signal amplification 323 amplifies the RF signal. The step of image rejection 324 uses a tunable image rejection filter to perform band filtering on the RF signal. The first frequency mixing 325 mixes the RF signal and the local oscillation signal to generate an intermediate frequency signal. The second frequency mixing 326 mixes the intermediate frequency reference signal and the intermediate frequency signal to produce a DC frequency difference signal. The feedback control 327 uses the DC frequency difference signal to adjust the central frequency of the tunable image rejection filter until it is stable. The central frequency of the filter is thus obtained.

Figure 8:
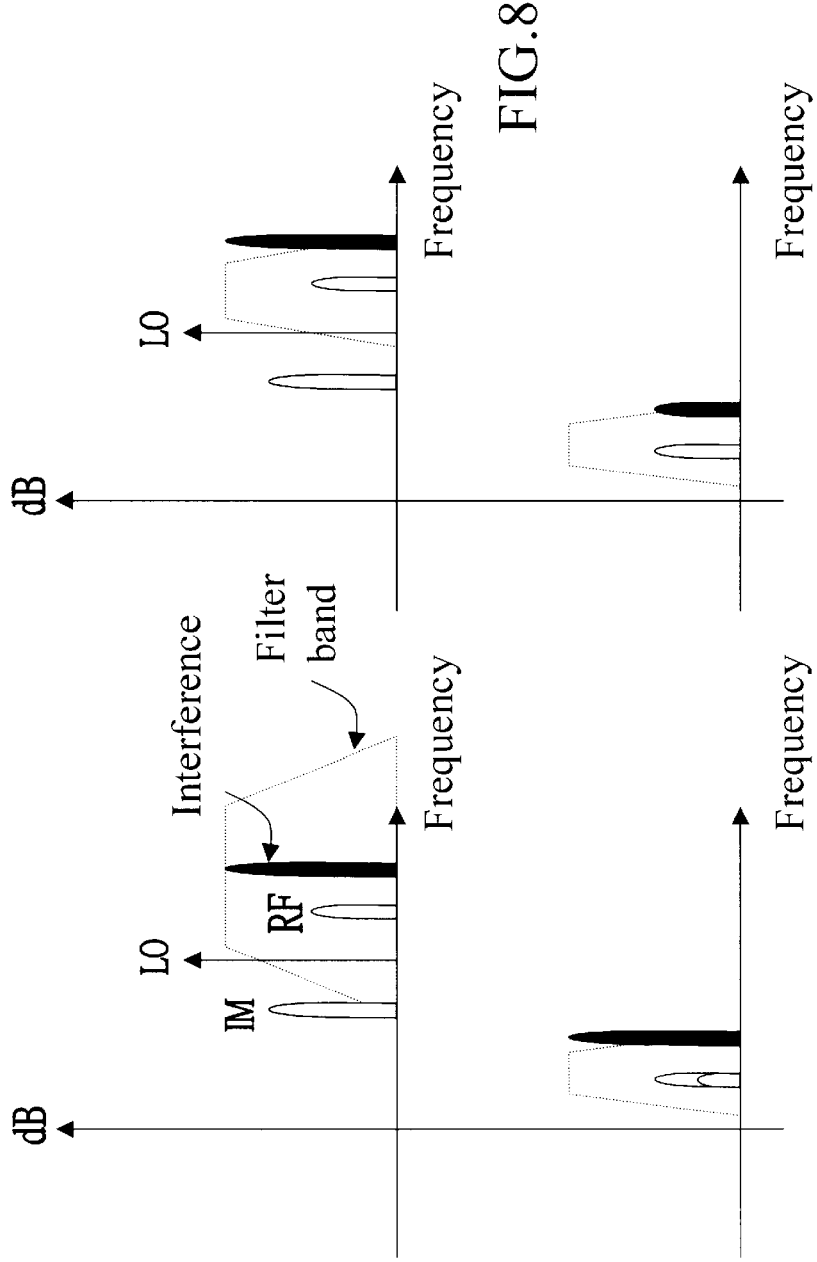
FIG. 8 compares the present invention and the prior art.
Figure 9:
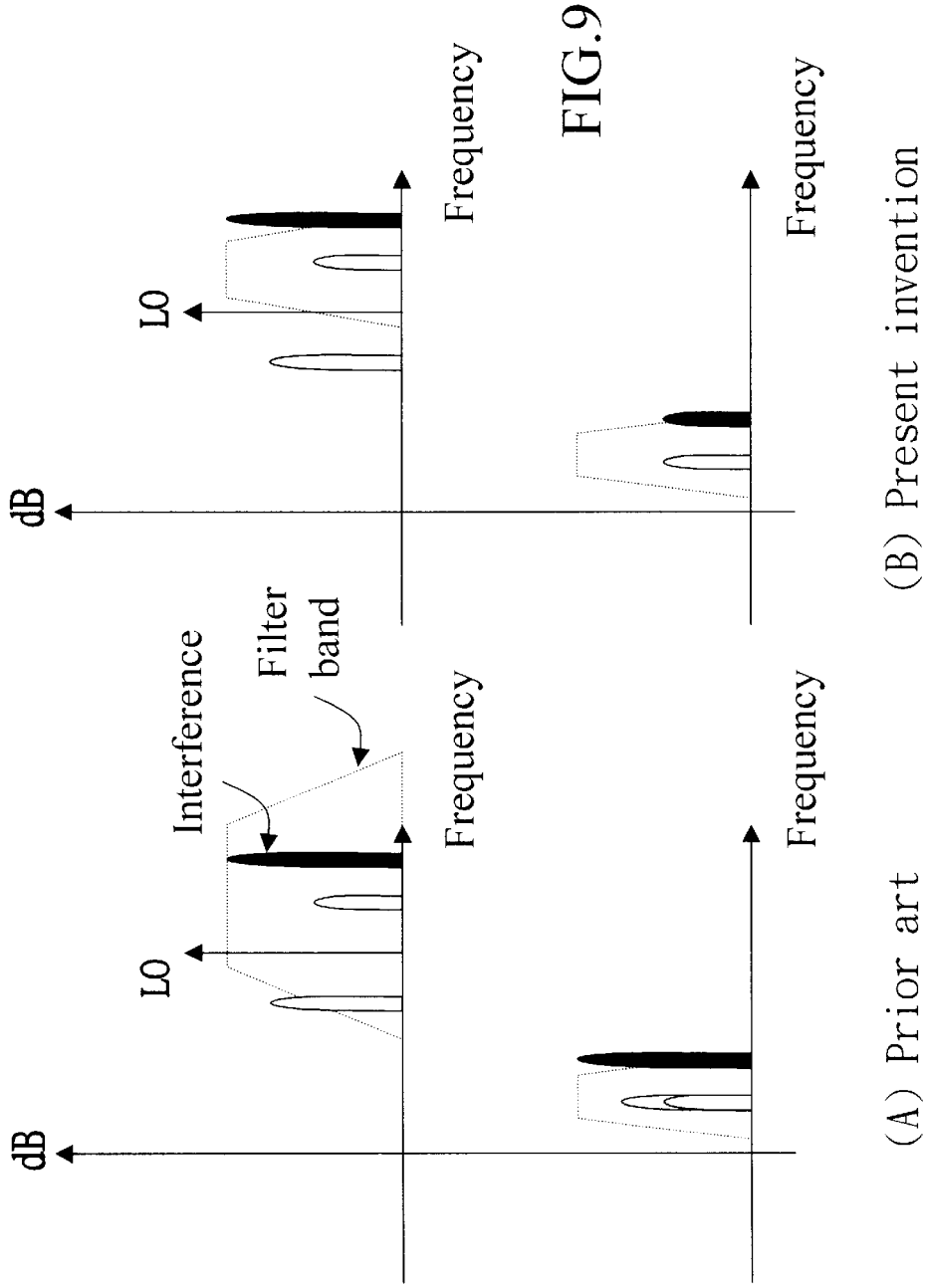
FIG. 9 also compares the present invention and the prior art.

Please refer to both FIG. 8 and FIG. 9 for a comparison between the present invention and the prior art. When the image falls in the middle or at the edge of the band select filter, the prior art uses a band select filter with a fixed bandwidth to reject images. Since the band select filter has to apply to all radio frequencies, the bandwidth has to be designed to be wider and therefore there will be residue images. The remaining images are hard to be separated from the RF signals. Thus, the RF signals will be interfered.

The present invention uses a tunable image rejection filter to lock in the RF signal frequency and then perform filtering. The filtering bandwidth can be made narrower to effectively reject images. By removing nearby channel interference using a channel select filter, an interference free intermediate frequency signal can be obtained.

Figure 10:
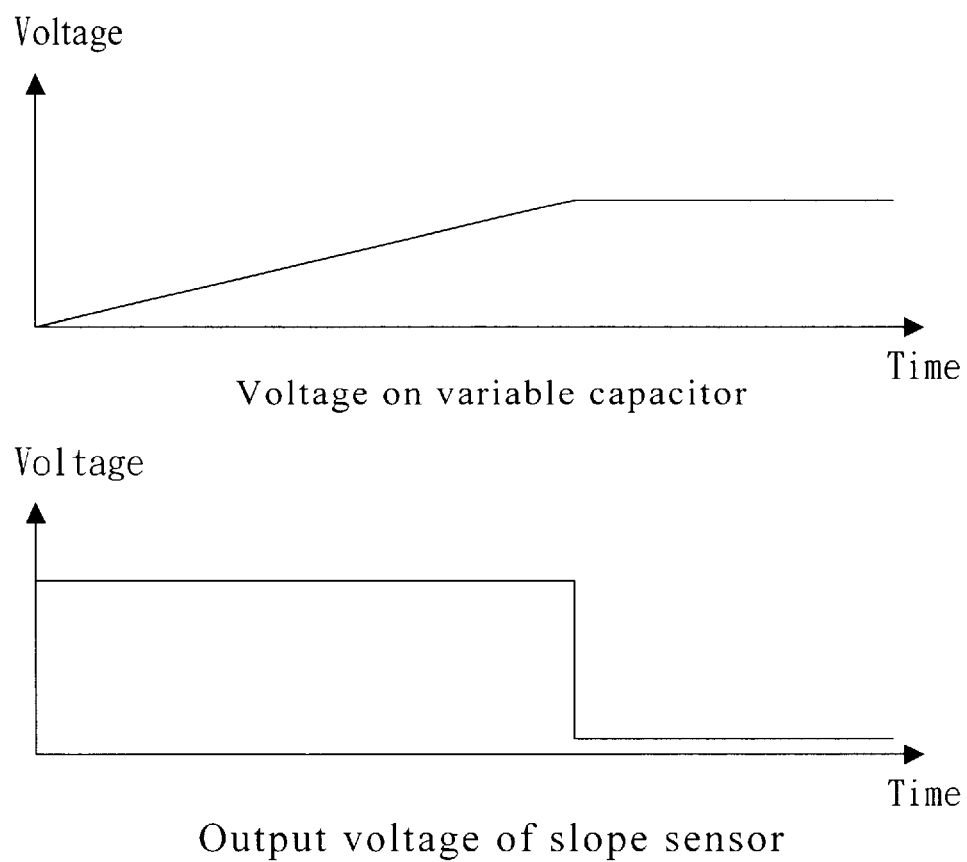
FIG. 10 shows an example of the wave forms of the slope sensor output and the voltage on the variable capacitor.

As shown in FIG. 10, the constant current source provides a constant current in the tuning mode to charge (or discharge) the control capacitor. The voltage of the variable capacitor is increasing (or decreasing. It depends on the initial voltage of the variable capacitor). When the slope sensor finds that the slope of the time-dependent DC frequency difference signal changes its sign (from positive to negative, or vice versa), the constant current source is then shut off so that the variable capacitor reaches a certain voltage and does not get higher (or lower). An example of output signal as shown in FIG. 10 is then produced.

Figure 11:
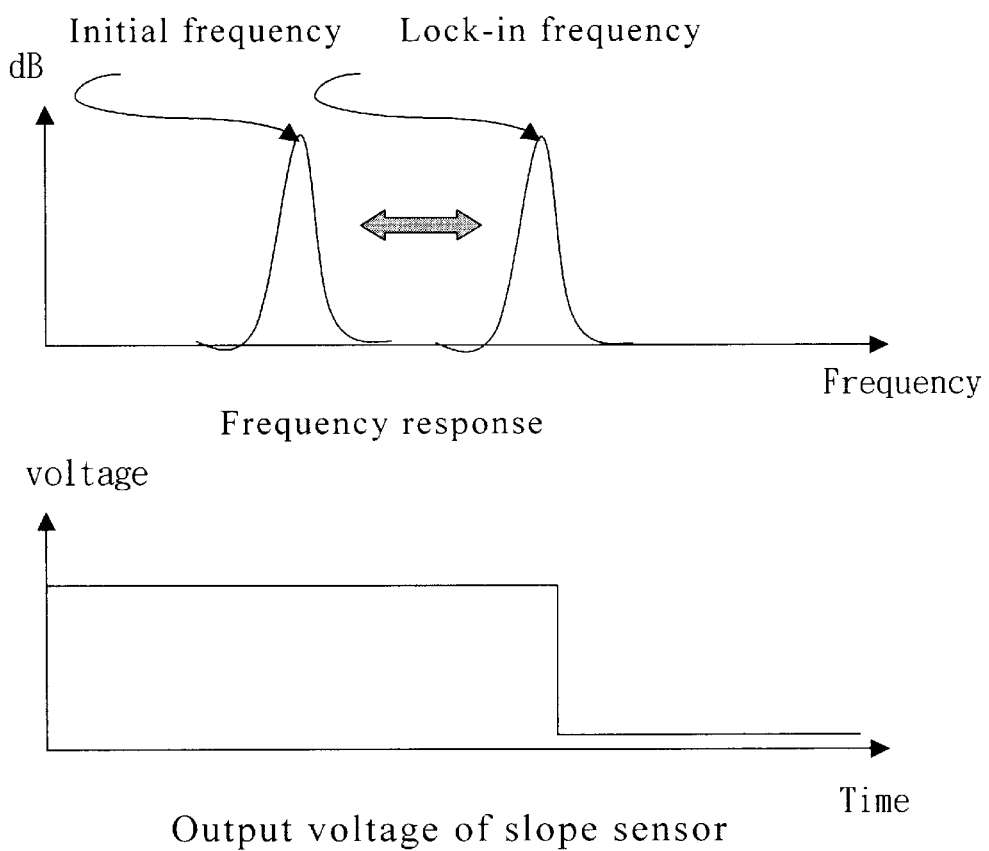
FIG. 11 shows an example of the output wave forms of the central frequency of the tunable image rejection filter and the slope sensor.

As shown in FIG. 11, the output signal of the slope sensor can change the central frequency of the tunable image rejection filter. The scanning starts from an initial frequency until the feedback control gives a stable feedback, i.e., a lock-in frequency. The variation of the central frequency of the tunable image rejection filter is also shown in FIG. 11.

Effects of the Invention

The present specification discloses a method and device of frequency lock filtering for receivers. The central frequency of the image rejection filter is tuned through feedback control and locks in the RF for filtering when receiving signals. Since the present invention tunes the central frequency of the tunable image rejection filter according to the received frequency, it can accurate filter the signal and increase the abilities to reject images and nearby channel interferences.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A frequency lock filtering receiver, which locks in the central frequency of a filter through feedback control in a tuning mode and filters received radio frequency (RE) signals according to the lock-in central frequency in a receiving mode; the receiver comprising:

an antenna, which receives the RF signal in the receiving mode;

a frequency synthesizer, which generates a local oscillation signal and further generates the RF signal and an intermediate frequency reference signal in the tuning mode;

a band select filter, which connects to the frequency synthesizer in the tuning mode and connects to the antenna in the receiving mode to receive the RF signal and to perform band filtering;

an amplifier, which connects to the band select filter to amplify the RF signal;

a tunable image rejection filter, which connects to the amplifier to perform band filtering on the RF signal using a tunable central frequency;

a first mixer, which connects to the tunable image rejection filter, receives the RF signal and the local oscillation signal generated by the frequency synthesizer, and mixes the RF signal and the local oscillation signal to produce an intermediate frequency signal;

a second mixer, which mixes the intermediate frequency reference signal and the intermediate frequency signal to produce a frequency difference signal; and a feedback control circuit, which connects to the second mixer and the tunable image rejection filter in the tuning mode and uses the frequency difference signal to tune the central frequency of the tunable image rejection filter until it is stable, thus obtaining the central frequency of the tunable image rejection filter.

2. The receiver of claim 1, wherein the amplifier is a low noise amplifier (LNA).

3. The receiver of claim 1, wherein the feedback control circuit comprises:

a feedback filter, which perform low pass filtering on the frequency difference signal;

a slope sensor, which connects the low pass filter to detect the slope of the frequency difference signal;

a constant current source, which provides a constant current generated by the slope sensor and whose on and off are controlled by the output signals that are further controlled by the slope of the DC frequency difference signal;

a control capacitor, which is charged by the constant current source to obtain a control voltage; and a variable capacitor, which connects to the control capacitor and the tunable image rejection filter to tune the central frequency of the tunable image rejection filter according to the control voltage on the control capacitor.

4. The receiver of claim 3, wherein the slope sensor comprises:

a reference voltage source to provide a constant voltage;
a differential pair connected to the low pass filter;
a first differential circuit connected to the differential pair for performing signal differentiation;

a second differential circuit connected to the differential pair for performing signal differentiation; and a logic controller connected to the first differential circuit and the second differential circuit for controlling the on and off of the constant current source.

5. The receiver of claim 4, wherein the first differential circuit comprises:

a first capacitor;
a first resistor;
a first hysteresis comparator; and
a first amplifier, whose positive input terminal connects to the reference voltage source, whose negative input terminal connects to the first capacitor and the first resistor, and whose output terminal connects to the first hysteresis comparator and the first resistor.

6. The receiver of claim 4, wherein the second differential circuit comprises:

a second capacitor;
a second resistor;
a second hysteresis comparator; and
a second amplifier, whose positive input terminal connects to the reference voltage source, whose negative input terminal connects to the second capacitor and the second resistor, and whose output terminal connects to the second hysteresis comparator and the second resistor.

7. The receiver of claim 1 further comprising a power amplifier connected to the frequency synthesizer for amplifying the RF signal.

8. The receiver of claim 1 further comprising a channel select filter connected to the first mixer for filtering the intermediate frequency signal.

9. The receiver of claim 1 further comprising a 90 degree phase generator connected to the frequency synthesizer for producing a phase difference of 90 degrees on the local oscillation signal.

10. The receiver of claim 9 further comprising a third mixer connected to the tunable image rejection filter and the 90 degree phase generator for mixing the RE signal and the local oscillation signal to produce the intermediate frequency signal.

11. A receiving method using frequency lock filtering, which comprises the steps of:

channel setting, which sets a receiving frequency;

frequency tuning, which uses a frequency synthesizer to generate an RF signal of the receiving frequency and tunes the central frequency of a tunable image rejection filter through feedback control to lock in the central frequency of the filter; and signal receiving, which uses an antenna to receive the RF signal with the receiving frequency and takes the lock-in central frequency of the filter as the central frequency of the tunable image rejection filter, thereby filtering and receiving the RF signal, wherein the step of frequency tuning comprises the steps of:

generating signals, which uses the frequency synthesizer to generate the RF signal, a local oscillation signal and an intermediate frequency reference signal;

band filtering, which uses a band select filter to filter the RF signal;

signal amplification, which amplifies the RF signal;

image rejection, which uses the tunable image rejection filter to perform band filtering on the RF signal;

first frequency mixing, which mixes the RF signal and the local oscillation signal to produce an intermediate frequency signal;

second frequency mixing, which mixes the intermediate frequency reference signal and the intermediate frequency signal to produce a frequency different signal; and feedback control, which uses the frequency difference signal to tune the central frequency of the tunable image rejection filter until it is stable, thus obtaining the lock-in central frequency of the filter.

12. The method of claim 11, wherein the step of signal amplification is achieved by a low noise amplifier (LNA).

13. The method of claim 12, wherein the step of feedback control is achieved using a feedback control circuit comprising:

a feedback filter, which perform low pass filtering on the frequency difference signal;

a slope sensor, which connects the low pass filter to detect the slope of the frequency difference signal;

a constant current source, which provides a constant current generated by the slope sensor and whose on and off are controlled by the output signals that are further controlled by the slope of the DC frequency difference signal;

a control capacitor, which is charged(or discharged) by the constant current source to obtain a control voltage; and a variable capacitor, which connects to the control capacitor and the tunable image rejection filter to tune the central frequency of the tunable image rejection filter according to the control voltage on the control capacitor.

14. The method of claim 11, wherein the step of signal receiving comprises the steps of:

receiving the RF signal, which receives the RF signal using an antenna;

band filtering, which uses a band select filter to filtering the RF signal;

signal amplification, which uses an amplifier to amplify the RF signal;

image rejection, which uses a tunable image rejection filter to perform band filtering on the RF signal;

generating an oscillation signal, which uses a frequency synthesizer to generate a local oscillation signal; and generating an intermediate frequency signal, which mixes the RF signal and the local oscillation signal to produce an intermediate frequency signal.

* * * * *